United States Patent
Hong

(10) Patent No.: US 7,366,534 B2
(45) Date of Patent: Apr. 29, 2008

(54) WIRELESS COMMUNICATION APPARATUS, METHOD THEREOF, AND WIRELESS COMMUNICATION SYSTEM EMPLOYING THE SAME

(75) Inventor: Jin-seok Hong, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 368 days.

(21) Appl. No.: 10/003,417

(22) Filed: Dec. 6, 2001

(65) Prior Publication Data

US 2002/0107039 A1    Aug. 8, 2002

(30) Foreign Application Priority Data

Feb. 3, 2001    (KR) ................... 2001-5289

(51) Int. Cl.
*H04B 7/00* (2006.01)
*H04Q 7/20* (2006.01)

(52) U.S. Cl. ............... 455/509; 455/41.1; 455/41.2; 455/455; 455/464; 455/512; 370/230; 370/431

(58) Field of Classification Search ............ 455/452.2, 455/455, 464, 509, 512, 41.1, 41.2; 370/230, 370/326, 336, 346, 395.43, 441–443, 431, 370/449

See application file for complete search history.

(56) References Cited

U.S. PATENT DOCUMENTS

| | | | | |
|---|---|---|---|---|
| 6,266,330 B1* | 7/2001 | Jokinen et al. | ............. | 370/329 |
| 6,512,751 B1* | 1/2003 | Struhsaker et al. | ......... | 370/329 |
| 6,717,926 B1* | 4/2004 | Deboille et al. | ............ | 370/330 |
| 2001/0005368 A1* | 6/2001 | Rune | ............... | 370/390 |
| 2001/0055973 A1* | 12/2001 | Uchida | ........... | 455/452 |
| 2002/0090004 A1* | 7/2002 | Rinchiuso | ............. | 370/468 |
| 2002/0167961 A1* | 11/2002 | Haartsen | ............. | 370/444 |
| 2003/0012173 A1* | 1/2003 | Rune | ............ | 370/344 |
| 2003/0139186 A1* | 7/2003 | Igarashi et al. | ............. | 455/438 |

FOREIGN PATENT DOCUMENTS

| | | |
|---|---|---|
| EP | 0 929 161 A3 | 7/1999 |
| JP | 10-75236 A | 3/1998 |
| JP | 10-135925 A | 5/1998 |
| JP | 2000-59333 A | 2/2000 |
| JP | 2000-216752 A | 8/2000 |
| WO | WO 00/74275 A1 | 12/2000 |

OTHER PUBLICATIONS

Haartsen J C; "The Bluetooth Radio System" IEEE Personal Communications, IEEE; vol. 7; No. 1; Feb. 2000; pp. 28-36; XP000908653.

(Continued)

*Primary Examiner*—Sujatha Sharma
(74) *Attorney, Agent, or Firm*—Sughrue Mion, PLLC

(57) ABSTRACT

A wireless communication apparatus, a method thereof, and a wireless communication system employing the same. The wireless communication apparatus for transmitting and receiving data wirelessly includes a transmitting portion for transmitting the data through at least one frequency channel, and a controller for obtaining a number of transmittable channels of a counterpart wireless communication apparatus that the wireless communication apparatus intends to communicate with, and processing to transmit the data through the transmitting portion according to the obtained number of transmittable channels. Accordingly, data can be transmitted and received simultaneously through multiple channels, and time consumption for the data transmission and reception can be greatly reduced.

7 Claims, 6 Drawing Sheets

OTHER PUBLICATIONS

European Telecommunications Standards Institute; ETSI TS 101 038 Technical Specification; Digital cellular telecommunication system (Phase 2+); High Speed Circuit Switched Data (HSCSD)—Stage 2 (GSM 03.34 version 7.0.0 Release 1998); ETSI TS 101 038 V7.0.0, XX, XX, Aug. 1999; pp. 1-20; XP002227973.

Curcio I D D et al; "QoS of mobile videophones in HSCSD networks"; Computer Communications and Networks, 1999. Proceedings. Eight International Conference on Boston, MA, USA Oct. 11-13, 1999, Piscataway, NJ, USA, IEEE, US; Oct. 11, 1999; pp. 447-451; XP010359582.

* cited by examiner

WIRELESS COMMUNICATION APPARATUS, METHOD THEREOF, AND WIRELESS COMMUNICATION SYSTEM EMPLOYING THE SAME

BACKGROUND OF THE INVENTION

1. Field of the Invention

The present invention relates to a wireless communication apparatus and communication method thereof, and more particularly to a wireless communication apparatus, a method thereof and a wireless communication system capable of transmitting and receiving data via a plurality of channels in a Bluetooth system. The present application is based on Korean Patent Application No. 2001-5289, which is incorporated herein by reference.

2. Description of the Related Art

Bluetooth communication has become popular recently, because it enables transmission of data such as audio data, video data, etc at a maximum speed of 1 Mbps within a distance ranging from 10 m to 100 m.

The general Bluetooth system uses an Industrial Scientific Medical bandwidth of 2.4 GHz. FIG. 1 shows the structure of a piconet in the general Bluetooth communication system.

Referring to FIG. 1, the Bluetooth communication system includes one master device M and a plurality of slave devices $S_1$-$S_7$ connected with each other. As described, the network in which one master device M is connected with at least one slave device $S_1$-$S_7$, is called a 'piconet'. In one piconet, a maximum of seven (7) slave devices can be connected to one master M.

FIG. 2A shows a frequency channel of the general Bluetooth communication system.

A pair of devices, i.e., one master device and one slave device, communicates with each other through one of seventy-nine (79) channels of 1 MHz bandwidth in the frequency band of 2.4 GHz for a time corresponding to a certain number of time slots (625 μs-3.125 ms). Data transmission rate per channel is 1 Mbps.

Further, in order to prevent interference among channels and fading effect during communication, a Frequency Hopping method is employed.

FIG. 2B shows the frequency hopping among the frequency channels of FIG. 2A.

The data is exchanged in packets through the channels, and the respective packets are transmitted in another hopping frequency. One packet is comprised of one, three, or five time slots.

In the current Bluetooth system, however, since the master device and the slave devices communicate in series only through one channel, there is a limit on the transmission speed.

Accordingly, even when there is much data to send, the data has to be transmitted at a limited speed.

SUMMARY OF THE INVENTION

The present invention has been made to overcome the abovementioned problems of the related art, and accordingly, it is an object of the present invention to provide a wireless communication apparatus, a method thereof, and a wireless communication system capable of transmitting and receiving a substantial amount of data in parallel.

The above object is accomplished by a wireless communication apparatus for transmitting and receiving data wirelessly in accordance with the present invention, including: a transmitting portion for transmitting the data through at least one frequency channel; and a controller for obtaining a number of transmittable channels of a counterpart wireless communication apparatus that the wireless communication apparatus intends to communicate with, and processing to transmit the data through the transmitting portion according to the obtained number of transmittable channels.

When the wireless communication apparatus receives the data through a plurality of frequency channels, the controller transmits the data through the plurality of frequency channels to the counterpart wireless communication apparatus.

When the wireless communication apparatus is operated as a master, the controller obtains the number of transmittable channels of the counterpart wireless communication apparatus, by performing an inquiry operation on the counterpart wireless communication apparatus.

Further, it is preferable that the frequency channel includes a basic channel for supporting a communication with other wireless communication apparatuses having a single channel, and a plurality of additional channels consecutively or inconsecutively positioned with respect to the basic channel.

The above object is also accomplished by a wireless communication apparatus for transmitting and receiving data wirelessly in accordance with the present invention, including: a transmitting portion for transmitting the data through a plurality of frequency channels; and a controller for dividing the data for transmission by a number of frequency channels, and processing to transmit the data to a counterpart wireless communication apparatus that the wireless communication apparatus intends to communicate with.

The above object is also accomplished by a method of a wireless communication apparatus for transmitting and receiving data wirelessly in accordance with the present invention, including the steps of: a source wireless communication apparatus of obtaining a number of transmittable frequency channels of a counterpart wireless communication apparatus that the wireless communication apparatus intends to communicate with, and transmitting the data according to the number of transmittable frequency channels of the counterpart wireless communication apparatus.

The method of a wireless communication apparatus for transmitting and receiving data wirelessly in accordance with the present invention, further includes the step of dividing the data for transmission by a number of a plurality of frequency channels, and transmitting the data to a counterpart wireless communication apparatus that the wireless communication apparatus intends to communicate with.

The above object is also accomplished by a wireless communication system in accordance with the present invention, including a plurality of wireless communication apparatuses operated as a master or a slave, wherein a wireless communication apparatus operated as the master obtains a number of transmittable frequency channels of a wireless communication apparatus operated as the slave, and transmits data according to the obtained number of transmittable frequency channels of the wireless communication apparatus operated as the slave.

Further, the above object is also accomplished by a wireless communication system in accordance with the present invention, including a plurality of wireless communication apparatuses operated as a master or a slave, wherein the wireless communication apparatus operated as the master divides data for transmission by a number of a plurality of frequency channels, and transmits the data to a wireless communication apparatus operated as the slave.

BRIEF DESCRIPTION OF THE DRAWINGS

A more complete appreciation of the invention, and many of the attendant advantages thereof, will be readily apparent as the invention becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
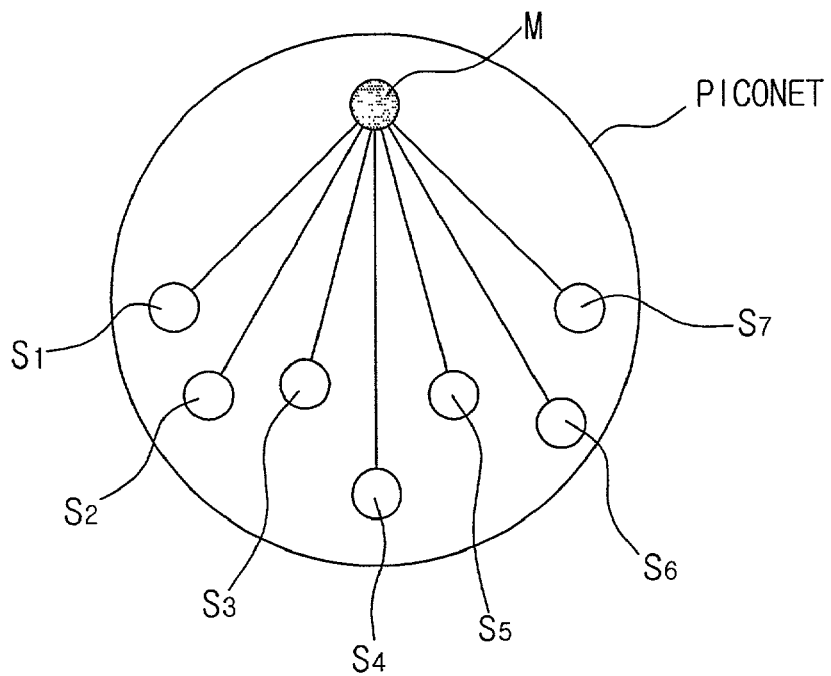
FIG. 1 is a view showing the structure of a piconet of a general Bluetooth communication system.
Figure 2A:
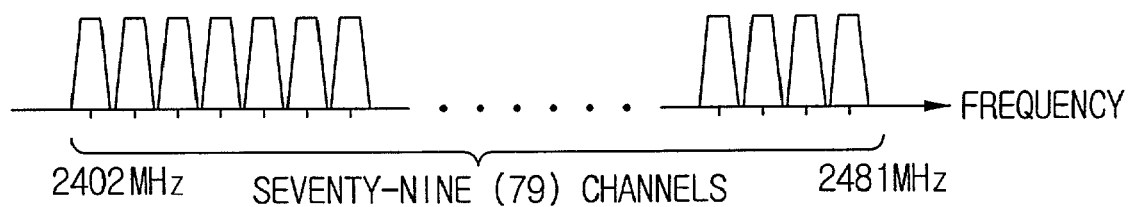
FIG. 2A is a view showing frequency channels of the general Bluetooth communication system.
Figure 2B:
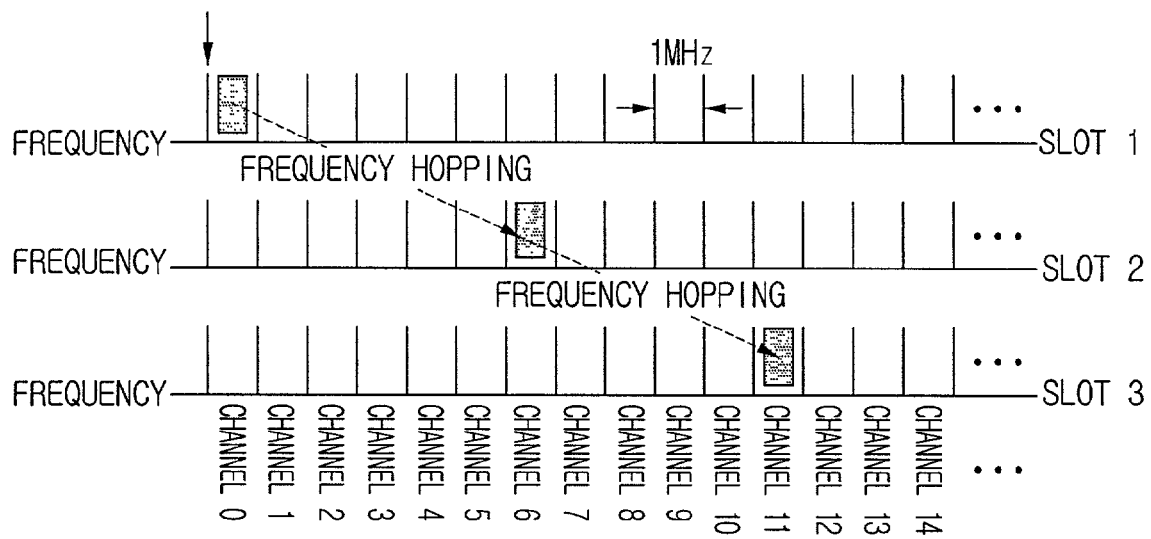
FIG. 2B is a view showing a frequency hopping among the frequency channels of FIG. 2A.

The preferred embodiments of the present invention will now be described with reference to the accompanying drawings, while the like elements are given the same reference numerals throughout and any redundant explanation is omitted as possible.

Figure 3:
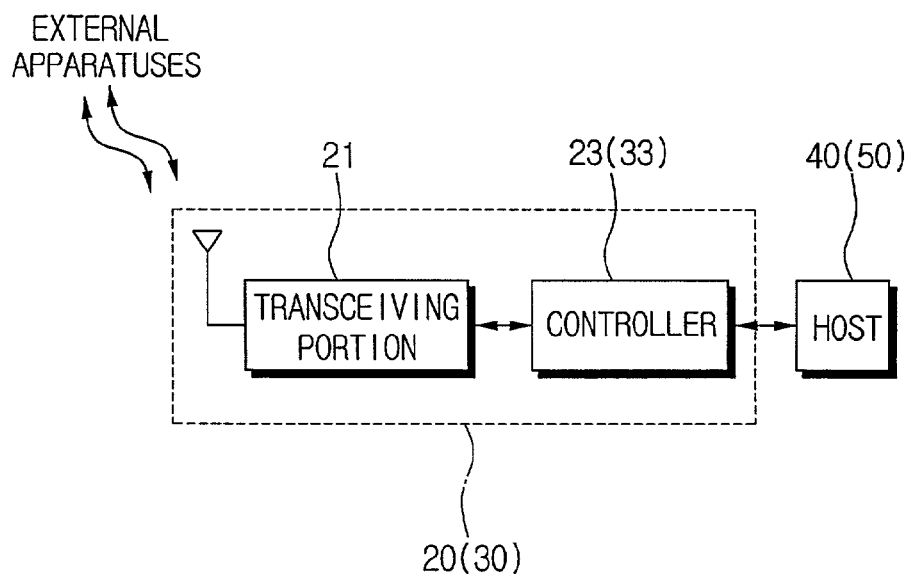
FIG. 3 is a block diagram showing a wireless communication apparatus in accordance with a preferred embodiment of the present invention.

FIG. 3 is a block diagram showing the wireless communication apparatus in accordance with the preferred embodiments of the present invention.

As shown in FIG. 3, a wireless communication apparatus 20(30) includes a transceiving portion (21), and a controller 23(33). The reference numerals 20, 23, and 40 refer to the wireless communication apparatus and elements thereof that are operated in accordance with the first preferred embodiment of the present invention, while the reference numerals in parenthesis, i.e., 30, 33, and 50 refer to the wireless communication apparatus and elements thereof that are operated in accordance with the second preferred embodiment of the present invention.

The transceiving portion 21 of the Bluetooth communication system processes a radio frequency of 2.4 GHz, and sends out a packet for transmission.

Figure 4:
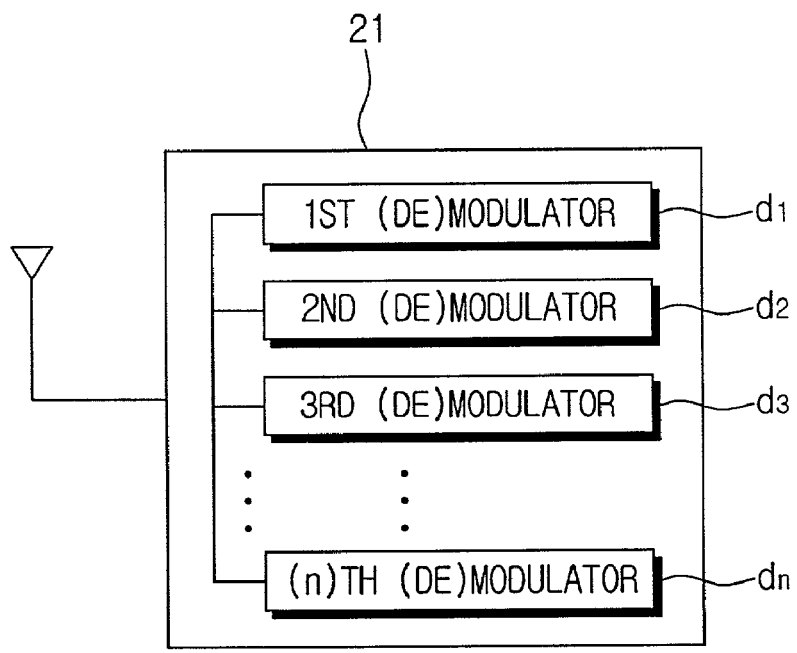
FIG. 4 is a view showing a transceiving portion of the wireless communication apparatus of FIG. 3.

FIG. 4 is a view showing the transceiving portion of the wireless communication apparatus of FIG. 3.

The transceiving portion 21 includes a plurality of data modulator/demodulators d1-dn, and thus is capable of opening a plurality of channels and transmitting/receiving in parallel the data through the open channels.

Figure 5:
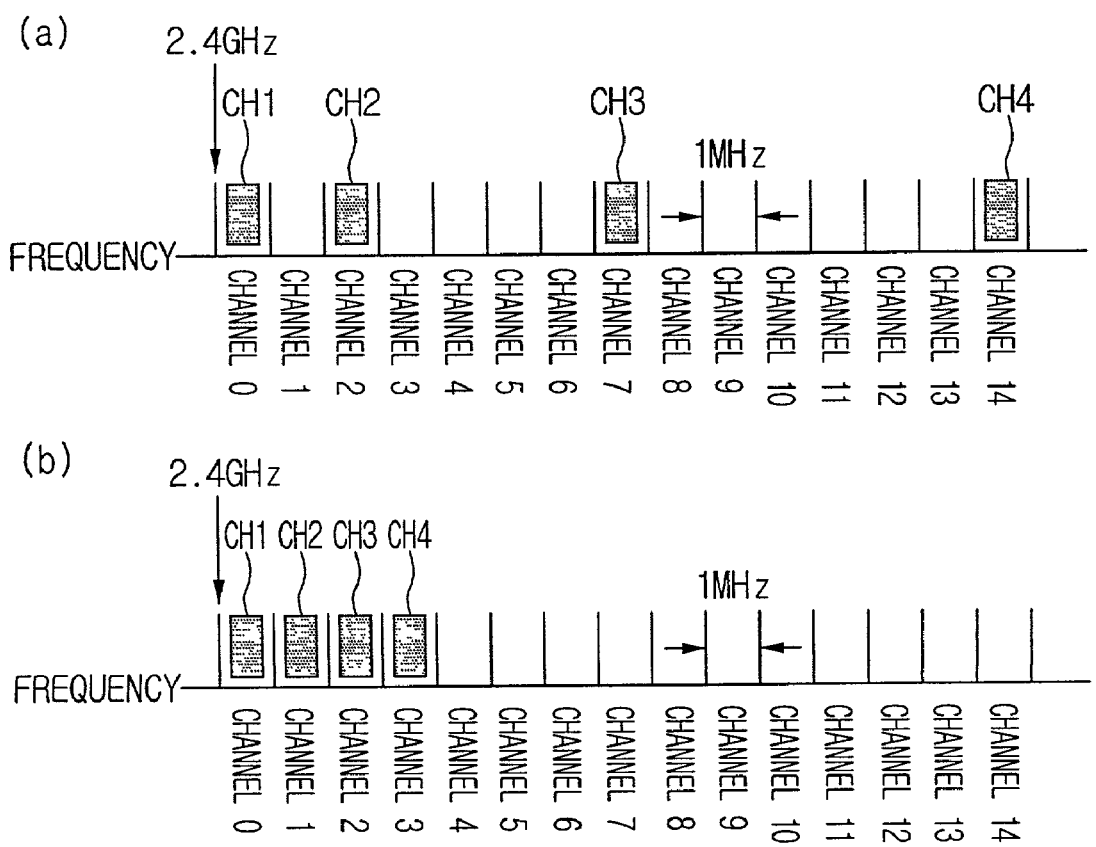
FIGS. 5(a) and 5(b) are views showing examples of opening four frequency channels of the wireless communication apparatus, respectively.

FIGS. 5(a) and 5(b) show examples of opening four frequency channels of the wireless communication apparatus, respectively.

Here, one open frequency channel includes one (1) basic channel CH1, with three (3) additional channels CH2, CH3, and CH4.

The basic channel CH1 is identical to the channel used by other wireless communication apparatuses, and is set to support the communication with other wireless communication apparatuses.

According to the conditions such as efficient configuration, Bit Error Ratio (BER), or the like, the additional channels CH2, CH3, CH4 may either be consecutively or inconsecutively established with reference to the basic channel CH1 (see FIGS. 5(a) and 5(b)).

The controller 23(33) is connected to the host 40(50) via a Host Controller Interface (HCI, not shown), and transmits and receives data and control signals. Here, the host 40(50) may include various communication terminals such as laptop computers, mobile phones, printers, etc.

The controller 23(33) performs functions of transceiving portion control, link control, packet control, logic channel control, data whitening, allocation of address, and security.

Further, the controller 23(33) transmits and receives data in parallel with the transceiving portion 21(31) and host 40(50) through a plurality of channels. When the controller 23(33) transmits data in parallel, the controller 23(33) applies a frequency hopping pattern to the additional channels CH2, CH3, CH4, corresponding to the frequency hopping pattern applied to the basic channel CH1.

According to the first preferred embodiment of the present invention, in the wireless communication apparatus that intends to transmit data (hereinafter briefly called 'transmitting apparatus'), the controller 23 obtains frequency channel characteristics of another wireless communication apparatus that is an intended recipient of the data transmission (hereinafter briefly called 'receiving apparatus'), and transmits the data through the transceiving portion 21 according to the frequency channel characteristics of the receiving apparatus.

The data transmission/reception method of the transmitting apparatus 20 with another wireless communication apparatus connected thereto in accordance with the first preferred embodiment will be described below with reference to FIG. 6.

Figure 6:
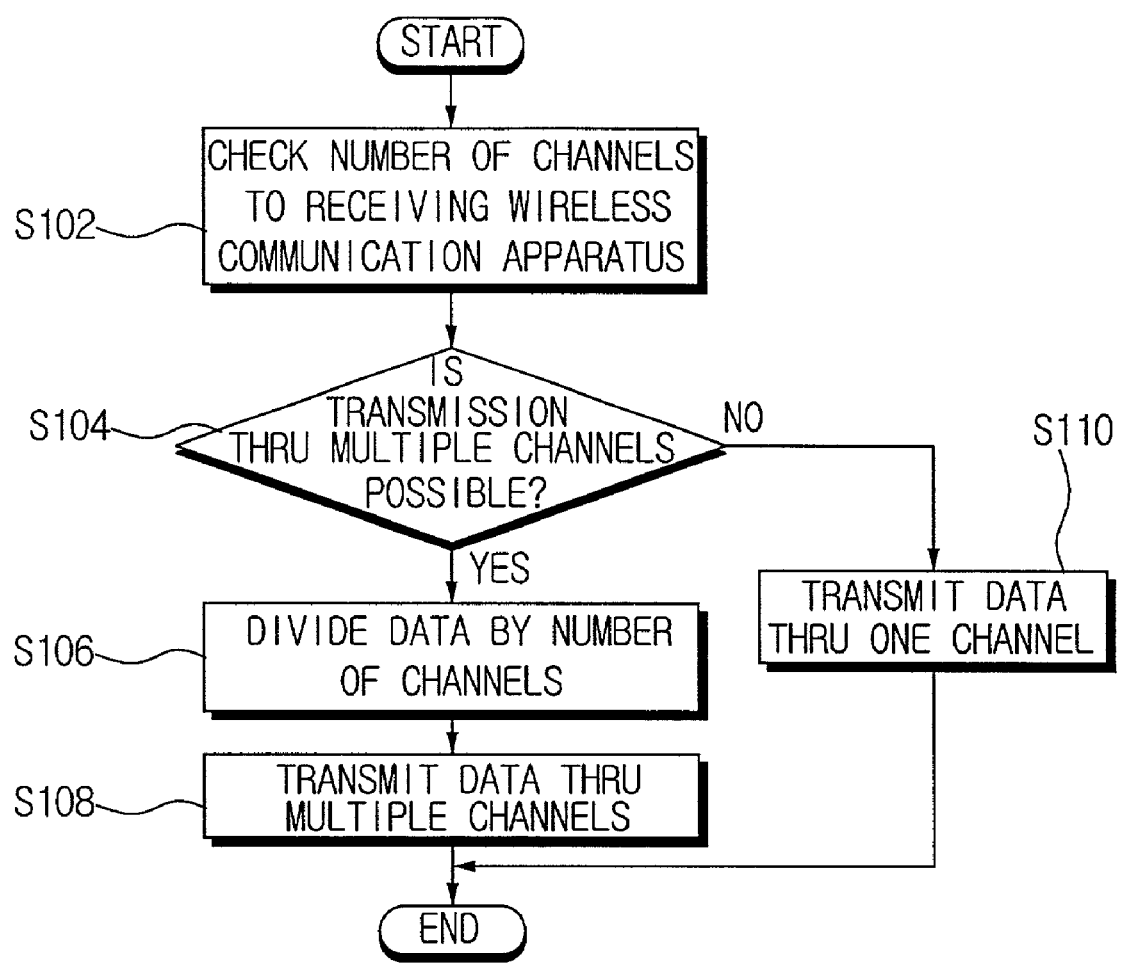
FIG. 6 is a flow chart showing the process of the wireless communication apparatus of FIG. 3, communicating in accordance with a first preferred embodiment of the present invention.

Referring to FIG. 6, the transmitting apparatus 20 obtains the frequency channel characteristics of the receiving apparatus (step S102).

More specifically, the transmitting apparatus 20 checks whether the receiving apparatus transmits data through a single channel as in the current Bluetooth communication system, or through multiple channels as in the first preferred embodiment of the present invention.

At this time, if the transmitting apparatus 20 is a master in the piconet, the transmitting apparatus 20 performs an inquiry operation with the receiving apparatus, or obtains the frequency channel characteristics of the receiving apparatus based on the Link Message Protocol (LMP) of the receiving apparatus.

Based on such obtained frequency channel characteristics of the receiving apparatus, the transmitting apparatus determines whether the receiving apparatus can receive the data through the multiple frequency channels (step S104).

If the receiving apparatus can receive the data through the multiple frequency channels, the transmitting apparatus divides the data by a number of the frequency channels (step S106), and transmits the data through the multiple frequency channels (step S108).

If the receiving apparatus can receive the data only through one frequency channel, then the transmitting apparatus transmits the data through the one frequency channel (step S110).

According to the second preferred embodiment of the present invention, irrespective of the data reception capacity of the receiving apparatus, the controller 33 divides the data by the number of the frequency channels and transmits the data to the receiving apparatus.

At this time, the controller 33 divides the data, respectively, depending on whether the data is for real time transmission or non-real time transmission.

Figure 7A:
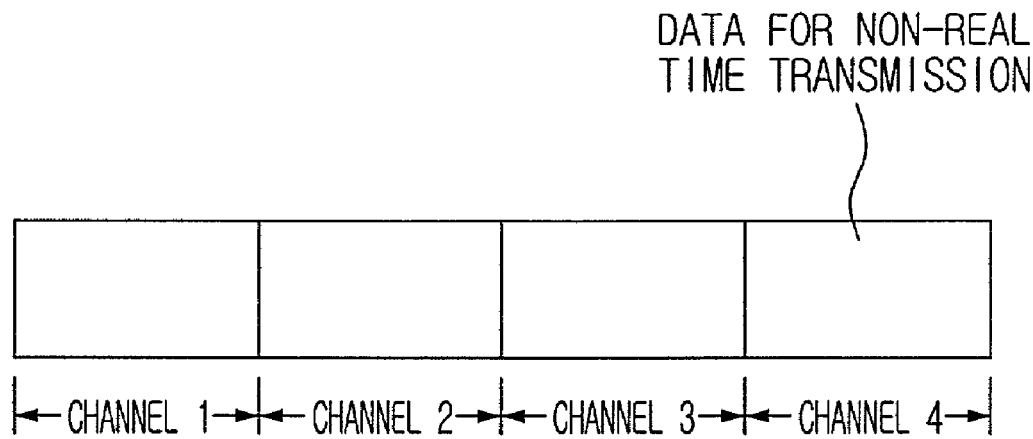
FIG. 7A is a view showing allocation of non-real time data to the channels.
Figure 7B:
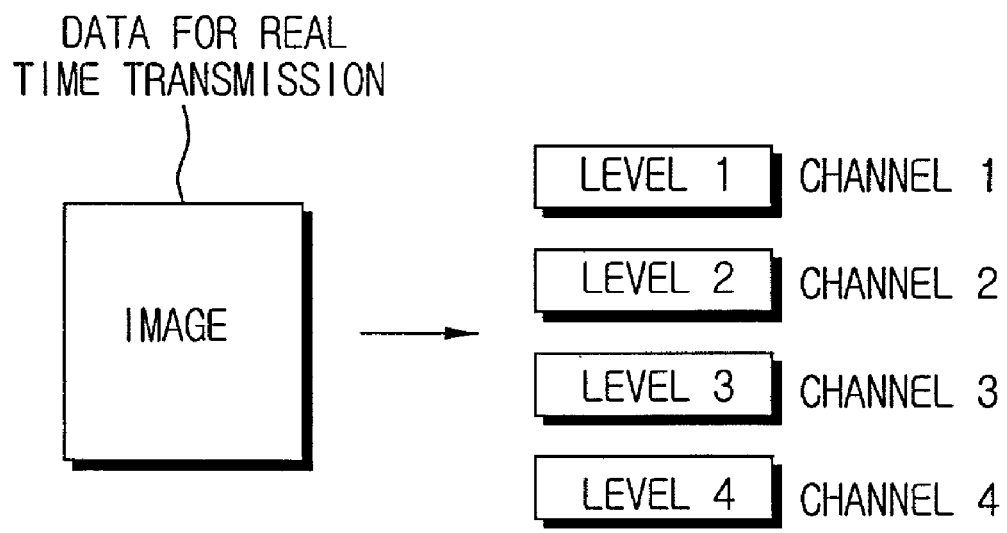
FIG. 7B is a view showing allocation of real-time data to the channels, respectively.

FIGS. 7A and 7B show examples of real time and non-real time data divisions, respectively.

If the data is for non-real time transmission, the controller 33 divides the real time data by the number of transmittable channels into respective levels. Then the controller 33 sets the basic information essential for utilization of real time data as the first level information, and allocates the first level information to the basic bandwidth. The controller 33 allocates information of lower levels to the additional bandwidth.

Further, the controller 33 checks the data reception through the respective frequency channels of the receiving apparatus, and obtains the frequency channel characteristics of the receiving apparatus. The controller then transmits the data according to the frequency channel characteristics of the receiving apparatus.

Next, a data transmission/reception method of the wireless communication apparatus 30 with another wireless communication apparatus connected thereto in accordance with the second preferred embodiment of the present invention will be described below with reference to FIG. 8.

Figure 8:
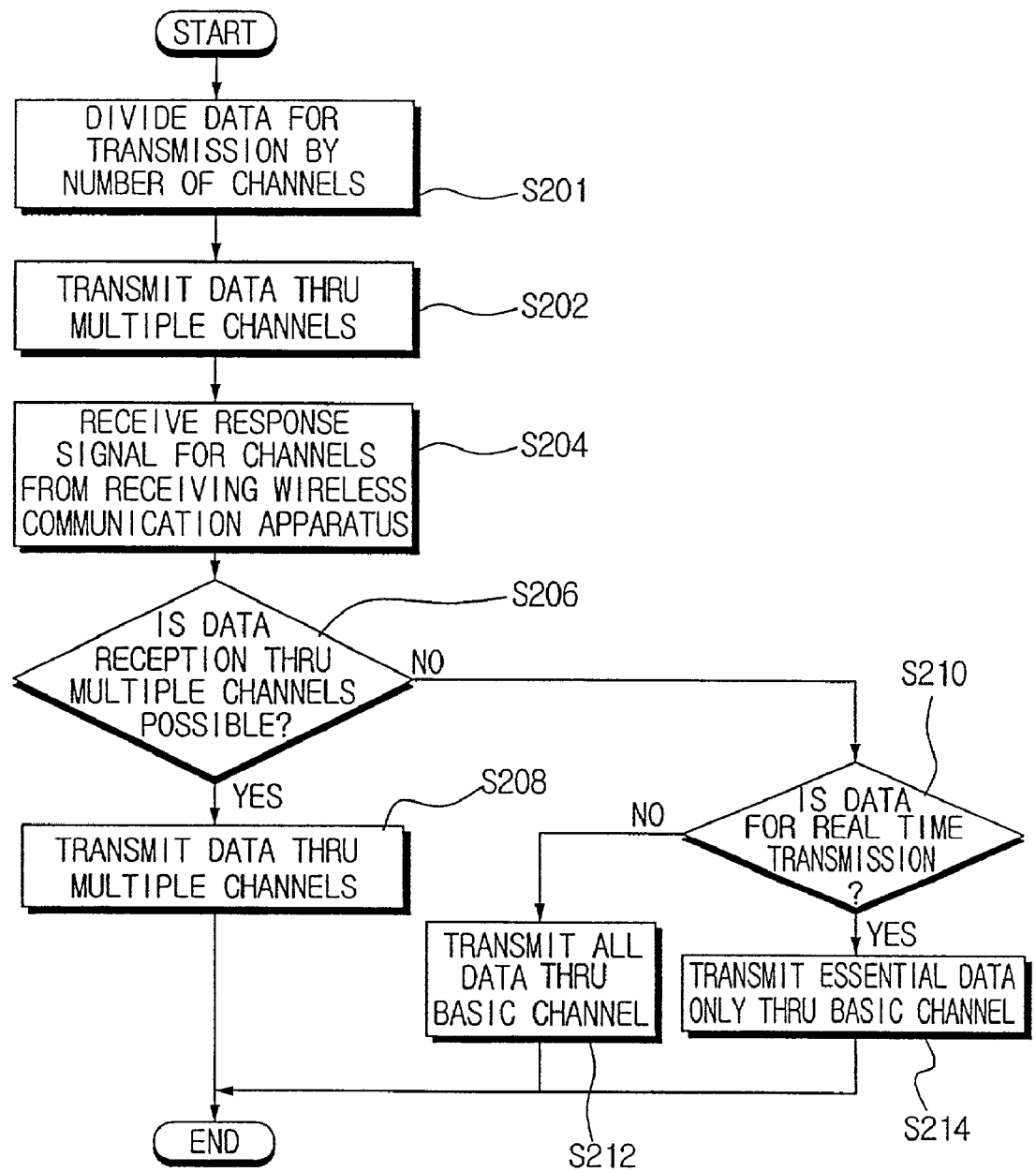
FIG. 8 is a flow chart showing the process of wireless communication apparatus of FIG. 3, communicating in accordance with a second preferred embodiment of the present invention.

Referring to FIG. 8, the wireless communication apparatus 30, which intends to transmit data, (hereinafter briefly called 'transmitting apparatus'), divides the data for transmission by the number of transmittable channels (step S201). Then the transmitting apparatus transmits the data through the multiple frequency channels (step S202).

Next, the transmitting apparatus receives from the receiving wireless communication apparatus (hereinafter briefly called 'receiving apparatus') response signals for the respective frequency channels (step S204).

According to the received response signals for the respective frequency channels, the transmitting apparatus 30 determines whether the receiving apparatus can receive the data through the multiple frequency channels (step S206).

If the receiving apparatus is determined to be able to receive the data through the multiple frequency channels, the transmitting apparatus 30 transmits the data, which is divided by the number of frequency channels, through the multiple frequency channels, respectively (step S208).

If the receiving apparatus is determined to be able to receive the data only through one frequency channel, the transmitting apparatus 30 checks whether the data is real time data or non-real time data (step S210).

Here, the real time data means the data that has to be consecutively transmitted, such as video data, audio data, or the like.

If the data is non-real time data, the transmitting apparatus 30 transmits the divided data all through the basic channel (step S212).

Meanwhile, if the data is real time data, the transmitting apparatus 30 transmits the data allocated to the basic channel through the basic channel (step S214). Accordingly, the data of the highest level is transmitted through the basic bandwidth.

The present invention should not be limited to the preferred embodiments described above but various changes and modifications can be made by one skilled in the art without departing from the spirit and scope of the present invention.

For example, although the Bluetooth system is described as an example in the above preferred embodiments, the present invention is also applicable to a general wireless communication system which communicates through a single channel. Accordingly, it would be understood that the present invention should not be limited to the preferred embodiments but limited to the scope of the present invention as hereinafter claimed.

As described above, according to the wireless communication apparatus, method thereof, and wireless communication system employing the same, since the data is transmitted and received simultaneously by using multiple channels, and still with compatibility with existing wireless communication apparatus using a single channel, a substantial amount of data can be transmitted and received simultaneously.

Further, according to the present invention, due to increased number of data transmitting channels, the time consumption for data transmission is reduced.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A wireless communication apparatus for transmitting and receiving data wirelessly with a counterpart wireless communication apparatus in an ad hoc network, comprising:
    a transmitting portion arranged for transmitting data to the counterpart wireless communication apparatus through a plurality of frequency channels; and
    a controller arranged to confirm the characteristics of data for transmission, divide the data into a number of pieces of data according to the data characteristics, allot the data to a predetermined number of channels, first transmit the data to a counterpart wireless communication apparatus, subsequently determine whether the counterpart wireless communication apparatus receives the data through the respective channels, to thereby obtain the number of transmittable channels to the counterpart wireless communication apparatus for communication, and transmit the data according to the obtained number transmittable frequency channels,
    wherein when the data for transmission is real-time data, the controller divides the data into grades to grade basic information for utilization of the real-time data for the highest level, allots the grades from the basic channel to additional channels according to the grades, and when the data for transmission is non-real-time data, the controller simply divides the data into a plurality of pieces of data, and allots the data to the plurality of frequency channels.

2. The wireless communication apparatus of claim 1, wherein the plurality of frequency channels include a basic channel for supporting a communication with other wireless communication apparatuses having a single channel, and a plurality of additional channels consecutively or inconsecutively positioned with respect to the basic channel.

3. The wireless communication apparatus of claim 2, wherein, while transmitting the data in parallel, the controller applies a frequency hopping pattern to the plurality of additional channels, corresponding to a frequency hopping pattern applied to the basic channel.

4. A method of a wireless communication apparatus for transmitting and receiving data wirelessly, comprising:
confirming data characteristics for transmission;
dividing the data according the confirmed data characteristics, allotting the respective divided data to a predetermined number of frequency channels, and first transmitting the data to the wireless communication apparatus;
confirming whether the counterpart wireless communication apparatus receives data through which frequency channel;
dividing the data for transmission by a number of a plurality of frequency channels, and transmitting the data to a counterpart wireless communication apparatus that the wireless communication apparatus intends to communicate with,
wherein, when the data for transmission is real time data, the operations of dividing and allotting divides the data into grades to grade basic information for utilization of the real-time data for the highest level, allots the grades from the basic channel to additional channels according to the grades, and when the data for transmission is non-real-time data, the operations of dividing and allotting divide the data into a plurality of pieces of data, and allot the data to the plurality of frequency channels, and
wherein, when the counterpart wireless communication apparatus receives the data only through one frequency channel, the data is transmitted through a basic channel.

5. The method of claim 4, wherein the plurality of frequency channels comprise a basic channel for supporting a communication with other wireless communication apparatuses having a single channel, and a plurality of additional channels consecutively or inconsecutively positioned with respect to the basic channel.

6. The method of claim 4, wherein, when the data is transmitted in parallel, a frequency hopping pattern is applied to the plurality of additional channels, corresponding to a frequency hopping pattern applied to the basic channel.

7. A wireless communication system comprising a plurality of wireless communication apparatuses operated as a master or a slave, wherein the wireless communication apparatus operated as the master confirms data characteristics for communication, and when the data for transmission is real time data, the wireless communication apparatus divides the data into grades to grade basic information for utilization of the real-time data for the highest level, allots the grades from the basic channels to additional channels according to the grades, and when the data for transmission is non-real-time data, the wireless communication apparatus divides the data into a plurality of pieces of data, and allots the data to the plurality of frequency channels, and the wireless communication apparatus checks whether the counterpart wireless communication apparatus receives the data in the respective channel, acquires the number of the transmittable frequency channels of the counterpart wireless communication apparatus, and transmits the data to the wireless communication apparatus operated as the slave according to the obtained number of transmittable channels.

* * * * *